US012288540B2

(12) United States Patent
Teel et al.

(10) Patent No.: US 12,288,540 B2
(45) Date of Patent: Apr. 29, 2025

(54) INTEGRAL SOUNDBOARD SUPPORT FOR A MUSICAL INSTRUMENT

(71) Applicant: Dreadnought, Inc., Wilmington, DE (US)

(72) Inventors: Timothy A. Teel, Lehighton, PA (US); Rameen J. Shayegan, Easton, PA (US); Daniel G. Hingston, Bath, PA (US); Joshua H. Parker, Easton, PA (US)

(73) Assignee: Dreadnought, Inc., Wilmington, DE (US)

(*) Notice: Subject to any disclaimer, the term of this patent is extended or adjusted under 35 U.S.C. 154(b) by 234 days.

(21) Appl. No.: 18/097,720

(22) Filed: Jan. 17, 2023

(65) Prior Publication Data

US 2024/0242699 A1 Jul. 18, 2024

(51) Int. Cl.
*G10D 3/22* (2020.01)
*G10D 1/08* (2006.01)

(52) U.S. Cl.
CPC ................. *G10D 3/22* (2020.02); *G10D 1/08* (2013.01)

(58) Field of Classification Search
CPC .................................. G10D 3/22; G10D 1/08
See application file for complete search history.

(56) References Cited

U.S. PATENT DOCUMENTS 552,116 A * 12/1895 Gaskins .................. G10D 1/08 84/267
1,241,639 A * 10/1917 Luis ......................... G10D 1/08 84/263
2,837,953 A 6/1958 Baschet
4,088,050 A * 5/1978 Appel ...................... G10D 1/08 84/452 P
4,573,391 A 3/1986 White
6,646,191 B1 * 11/2003 Martin ..................... G10D 3/02 84/291
6,833,501 B2 * 12/2004 Jagmin .................... G10D 3/06 84/293
9,305,527 B2 * 4/2016 Dwylitis .................. G10D 3/22
9,349,354 B1 * 5/2016 Galloup ................... G10D 1/08
10,262,633 B2 * 4/2019 Powers .................... G10D 3/06
10,629,169 B2 * 4/2020 Oberg ...................... G10D 1/08
10,803,840 B1 10/2020 Greene et al.
10,923,085 B2 * 2/2021 Powers .................... G10D 3/06
11,217,213 B2 1/2022 Greene et al.
2024/0242699 A1 * 7/2024 Teel ......................... G10D 1/08

* cited by examiner

*Primary Examiner* — Robert W Horn
(74) *Attorney, Agent, or Firm* — Armstrong Teasdale LLP

(57) ABSTRACT

An integral brace body providing support for a musical instrument soundboard. The body includes a back that faces the soundboard. A sidewall is integral with, connected directly to, and extends away from the back to form a top edge that engages the soundboard. A first brace extends horizontally across a width of the body from a first portion of the sidewall top edge to a second portion of the sidewall top edge, the first brace being integral with and connected directly to the sidewall, although not with the back, of the body. A second brace extends horizontally across the width of the body from a third sidewall portion to a fourth sidewall portion, the second brace being integral with and connected directly to both the sidewall and the back of the body. Also disclosed is a process for manufacturing a stringed musical instrument having an integral soundboard support.

20 Claims, 8 Drawing Sheets

INTEGRAL SOUNDBOARD SUPPORT FOR A MUSICAL INSTRUMENT

TECHNICAL FIELD

The present invention relates generally to the body of a stringed musical instrument and, more specifically, to a body that has integral soundboard support.

BACKGROUND OF THE DISCLOSURE

Music plays an important role in our daily lives and is woven into the fabric of society. Many people perform music as a pastime, a hobby, or an occupation. One of the main divisions of instruments, chordophone instruments are musical instrument that make sound by way of a vibrating string or strings stretched between two points. Chordophone instruments, and in particular string instruments, are very popular worldwide because they are versatile and suited to different genres of music. The most popular of the string instruments is probably the modern guitar, including both acoustic guitars which project sound acoustically and electric guitars which project sound through electrical amplification.

Conventional acoustic and electric musical instruments include a body and a neck that is attached to the body via a joint, with one or more elongate, flexible strings extending between the body and a distal end of the neck along a fretboard. (The terms “distal” or “distal end” are used to define the part or surface of an element which is positioned furthest from the user.) It is known to reinforce the joint that attaches the neck to the body. For example, U.S. Pat. No. 4,088,050 discloses a molded plastic toy stringed instrument. The toy stringed musical instrument has a soundbox, a neck, and a pegboard. The neck has a planar top surface with integral spaced side walls and integral longitudinal ribs, which in conjunction with integral transverse braces at the junction of the neck with the pegboard and with the soundbox, strengthen the instrument and resist torsional twisting.

Typically made from wood, the body of conventional acoustic and electric musical instruments has a bottom, a top called a soundboard that vibrates when the instrument is played, and a sidewall connecting the bottom and the top. The instrument top includes a sound hole, a neck end that is configured for attachment to the instrument neck with a longitudinal axis, a heel end, a transverse axis normal to the longitudinal axis, and a bottom surface.

It is known to use an inflatable bladder as a component in connection with instruments such as guitars to achieve a number of purposes. One purpose is as a resonance chamber for a guitar as shown in U.S. Pat. No. 2,837,953. The construction shown in this patent is not practical from a commercial standpoint, however, and this type of instrument has not been available.

U.S. Pat. No. 4,573,391 discloses a guitar, preferably of the acoustic type, but adaptable for electrical amplification. The guitar components may be readily disassembled and assembled to simplify handling and storage. The assembled components are maintained in their proper relationship by the tension of the strings. Acoustical quality is achieved by an inflatable bladder attached to the underside of the face panel, the bladder being encased within an envelope releasably affixed to the face panel periphery.

As is well known in the art, the primary quality characteristics of musical instruments are tone (i.e., the audible nature of the instrument including volume, brightness, evenness, note separation, etc.), playability (i.e., the responsiveness of the instrument to the player’s technique), and durability or sustain (i.e., the ability of the instrument to deliver tone and playability over years and decades). This document focuses on the tone and sustain of an instrument such as a guitar or ukulele. With respect to tone, the transfer of vibrations is critical to the tone or sound of the instrument. The term “sustain” is intended to mean a measure of musical sound over time. More particularly, sustain refers to the period of time that the sound of the instrument continues until it becomes inaudible.

In traditional guitar, ukulele, and other stringed musical instrument construction, the reinforcement of the soundboard (top) of the instrument is a critical design element, both for the instrument’s tonal qualities and for its structural stability against string tension. Without such reinforcement, instrument tops and, to a lesser extent, backs, are liable to deform, deflect, or warp under tension. Standard practice for applying reinforcement is a process by which brace materials, processed independently from the top, back, or sidewalls of the instrument, are attached via adhesive to the top and back of the instrument before assembly of the instrument’s body. In some cases, the top or back is glued to the sidewalls first, and then bracing is installed via the open pane of the instrument, from the inside.

The bodies of instruments such as flat top guitars and ukuleles commonly include a round or oval shaped sound hole in the top, beneath the strings and in front of the bridge or point of attachment for the strings. The sound hole creates a structurally weak spot allowing string tension to create physical distortions in the body of the instrument, potentially rendering the instrument non-functional. Structural members, such as braces, are required to counteract this deformation. In addition to counteracting deformation from string tension, the structural members are required to conduct and distribute vibration from the strings to assist in even vibration of the resonant chamber, or body, of the instrument. The various characteristics (e.g., number, shape, size, and position) of structural braces have been the subject of much development.

FIG. 7 of U.S. Pat. No. 11,217,213 issued to the assignee of the present application, Dreadnought, Inc., illustrates just one example of bracing suitable for the soundboard of a guitar. In the example shown, the soundboard is braced using the X-brace system, or a variation of the X-brace system, generally attributed to Christian Frederick Martin between 1840 and 1845 for use in gut string guitars. The system consists of two braces forming an “X” shape across the soundboard below the top of the sound hole. The lower arms of the “X” straddle and support the ends of the bridge. Under the bridge is a bridge patch (typically hardwood) which prevents the ball end of the strings from damaging the underside of the soundboard. Below the bridge patch are one or more tone bars which support the bottom of the soundboard. The tone bars abut one of the X braces and usually slant down towards the bottom edge of the soundboard. The top tone bar butts against a portion of the bridge patch in most instruments. On either side of the sound hole are angled braces that vertically span the horizontal transition between the upper bout and the lower bout of the soundboard. Around the lower bout, small finger braces support the area between the X-braces and the edge of the soundboard.

Instruments with strings attached to the center of the vibrating diaphragm in the manner of conventional flat top guitars and ukuleles are inefficient amplifiers of string energy. Much of the inertia imparted by the musician into the vibrating string is dissipated and lost through the supporting members of an instrument, rather than being amplified by the body of the instrument. This lost energy reduces the potential tone and sustain in a stringed instrument.

The action of vibrating strings is governed largely by the structure to which the strings are anchored and tensioned across. The more rigid the structure is made, the more the structure is resistant to vibrating. A structure resistant to vibrating will absorb little of the energy of the strings, allowing the strings to continue vibrating for an extended length of time. This characteristic of a rigid supporting structure and corresponding longer sustaining string vibration is manifested in a long sustaining musical tone of the instrument; this quality is a benefit to the musician performing on such an instrument.

One disadvantage of a rigid supporting structure is that the imparted limitation on vibration directly impacts the ability of the structure to resonate and convert the vibration of the strings into audible volume. Volume is measured in amplitude of vibration. Great volume is necessary for a musical instrument to amplify the vibration of the strings. The more flexible the supporting structure of the instrument is, the higher the amplitude or potential volume of the produced musical tones. Another disadvantage is that a rigid structure tends to be excessively heavy and may compromise tone. A lighter instrument structure tends to sound better but has a greater risk of structural damage.

Accordingly, the tone and sustain of a stringed instrument are fundamentally in conflict with one another and trade-offs are often required in design. An opposition exists between the rigidity needed for long sustaining vibration and the flexibility needed to produce audible volume in the form of vibrational amplitude. Some luthiers view balance of these two characteristics as preferable, and instruments are constructed conventionally in a manner which attempts to balance rigidity and flexibility to result in a musical instrument possessing both sustain and tone.

In view of the disadvantages outlined above, there exists a need for a musical instrument that removes the necessity of a separate process to apply braces to the body of the instrument. Related needs are to save manufacturing labor hours, to allow for single piece flow without having to use different materials for different components of the body, and to provide integrated top bracing that is machined from a single block of material (i.e., there are no separate braces). Another need is to allow tensioning from the inside of a musical instrument during glue up. There also exists a need for a wooden acoustic musical instrument body that enables unconventional grain orientations for braces. Yet another need is to allow the use of unique production and assembly techniques in the construction of stringed musical instruments.

BRIEF SUMMARY OF THE DISCLOSURE

To meet these and other needs and to overcome the shortcomings of existing musical instruments manufactured using separate braces, a body having integrated top bracing for musical instruments is provided. The integral brace body provides support for a soundboard of a musical instrument. The integral brace body includes a back, a sidewall, a first brace, and a second brace. The back is configured to face the soundboard, and defines a width of the integral brace body. The sidewall is integral with, connected directly to, and extends away from the back to form a top edge that engages the soundboard, thereby spacing the back from the soundboard, with the back, the sidewall, and the soundboard creating an internal space for sound resonance. The first brace extends horizontally and completely across the width of the integral brace body from a first portion of the top edge of the sidewall to a second portion of the top edge of the sidewall, the first brace being integral with and connected directly to the sidewall, although not with the back, of the integral brace body. The second brace extends horizontally and completely across the width of the integral brace body from a third portion of the sidewall to a fourth portion of the sidewall, the second brace being integral with and connected directly to both the sidewall and the back of the integral brace body.

Also disclosed is a process for manufacturing a stringed musical instrument having an integral soundboard support. An example embodiment of the process includes the following thirteen steps. A substantially rectangular block of material is provided. The block of material is fixed securely to a machining table. A chambered workpiece is formed having a sidewall, a back, and at least one solid and integral rib. Material is removed from the middle portion of the at least one rib to yield an integral brace body having two integral braces formed from the at least one rib. A wedge is placed inside the integral brace body under the first of the integral braces and on top of the other of the integral braces. An adhesive is applied to the top surfaces of the sidewall and the first integral brace. A soundboard is placed on top of the integral brace body and into contact with the adhesive. A first clamping caul is placed on and against a top surface of the soundboard and a second clamping caul is placed on and against a bottom surface of the back. Using a clamp, the outside rim of a glue caul which includes, from top to bottom, the first clamping caul, the soundboard, the adhesive, the integral brace body, and the second clamping caul is clamped securely. A bladder of the wedge is inflated until substantially even pressure is applied to the integral braces. The glue caul is allowed to sit for a predetermined amount of time. In turn, the clamp and then the first clamping caul and the second clamping caul are removed. The bladder is deflated and the wedge is removed from the integral brace body.

It is to be understood that both the foregoing general description and the following detailed description are exemplary, but are not restrictive, of the invention.

BRIEF DESCRIPTION OF THE DRAWING

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE DISCLOSURE

In this specification and in the claims that follow, reference will be made to a number of terms which shall be defined to have the following meanings ascribed to them. "Include," "includes," "including," "have," "has," "having," comprise," "comprises," "comprising," or like terms mean encompassing but not limited to, that is, inclusive and not exclusive. The indefinite article "a" or "an" and its corresponding definite article "the" as used in this disclosure means at least one, or one or more, unless specified otherwise. Directional terms as used in this disclosure—for example up, down, right, left, front, back, top, bottom—are made only with reference to the figures as drawn and are not intended to imply absolute orientation.

The stringed musical instruments in accordance with the present disclosure may include guitars, such as acoustic guitars, solid body electric guitars, and acoustic electric guitars, but may also include other stringed musical instruments such as, for example, ukuleles, banjos, mandolins, violins, lutes, and/or other similar instruments. Although the principles of the present disclosure are described in connection with guitars and ukuleles, it should be understood that the principles disclosed are also applicable to other stringed instruments which have an instrument body and an elongated neck along which the strings are stretched.

Figure 1:
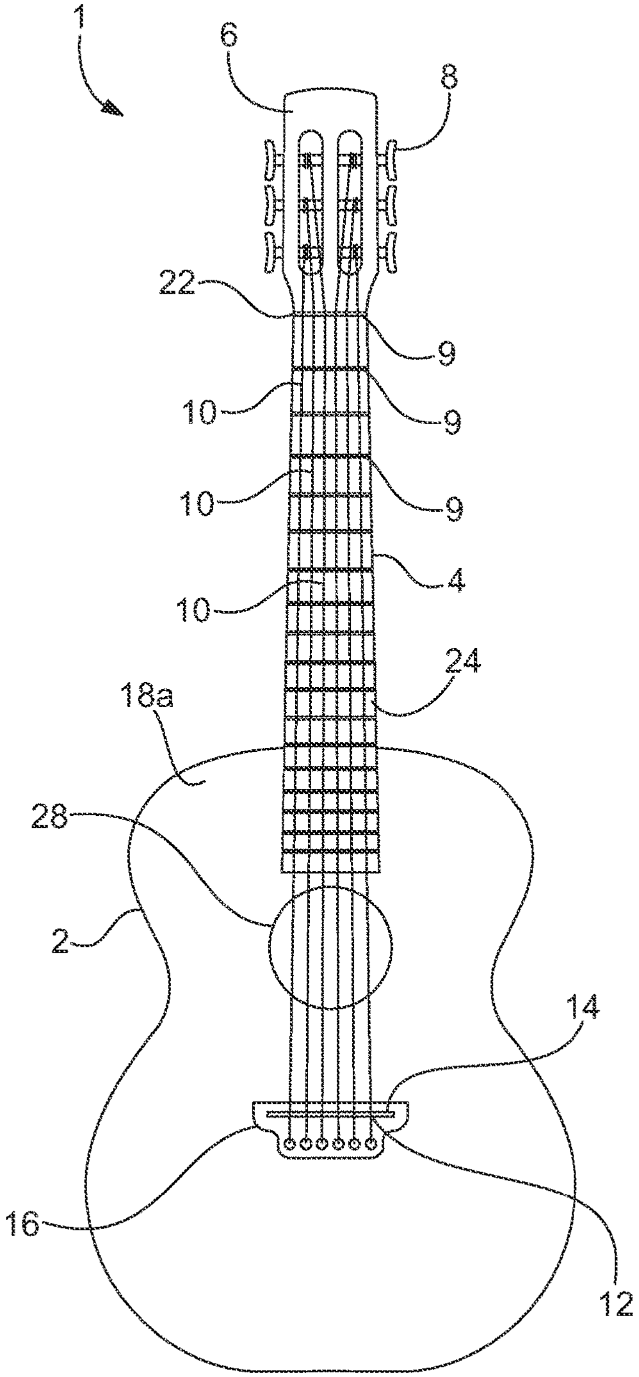
FIG. 1 is a diagrammatic perspective view of a conventional guitar.
Figure 2:
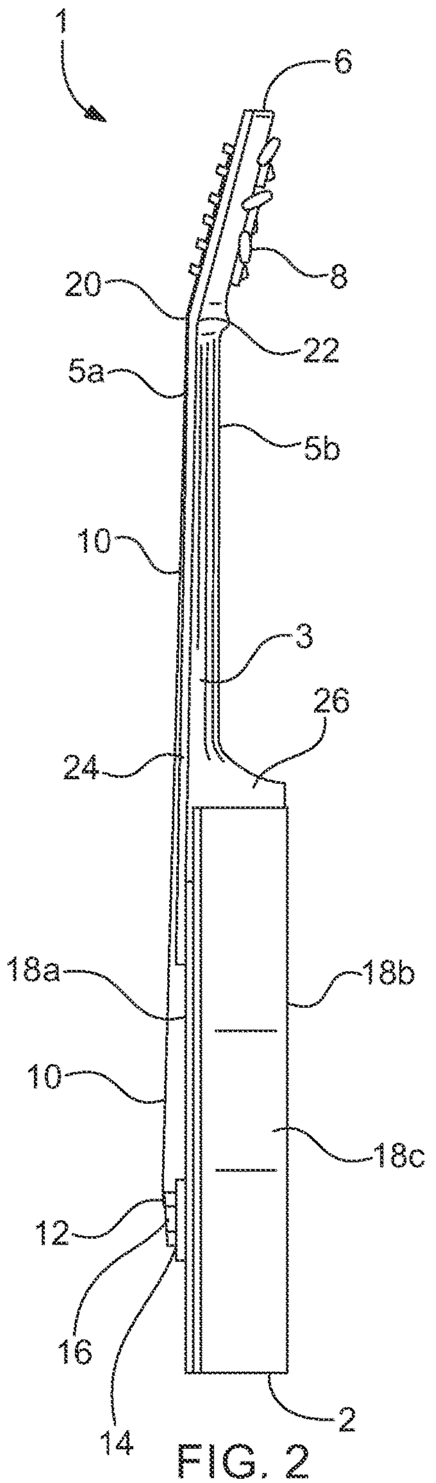
FIG. 2 is a diagrammatic side view of the guitar illustrated in FIG. 1.

Refer now to the drawing, in which like reference numbers designate like elements throughout the various figures that comprise the drawing. Turning first to FIGS. 1 and 2, a brief description concerning the various components of the stringed instrument, according to both the prior art and the present disclosure, will now be briefly discussed. As shown in these figures, the stringed musical instrument 1 has a body 2 connected to a neck 4 in a conventional manner. The body 2 is comprised of a front plate or soundboard 18*a* having a circular sound hole 28, a rear plate or back 18*b* facing the soundboard 18*a*, and a lateral plate or sidewall 18*c* combined with edges of the soundboard 18*a* and the back 18*b* in a way to be spaced apart from each other. Sound resonance is generated in the internal space formed by the soundboard 18*a*, the back 18*b*, and the sidewall 18*c*. Further, formed in one side of the body 2 is an aperture into which the neck 4 is inserted.

The neck 4 takes the form of a beam 3 having a considerable thickness with a top surface 5*a* and a bottom surface 5*b*. The neck 4 typically comprises a wood or some other similar or conventional material, which is suitable to withstand continual string pull without warping or twisting. The neck 4 has an integral headstock 6 which holds a number of separate tuning pegs 8 (typically six or possibly twelve tuning pegs) which each, in turn, respectively retain a free end of a desired string 10 in a conventional manner. The strings 10 are strung at substantial tension (e.g., about 30 pounds of tension per string for a guitar) and extend from a first fixed point or axis 12, formed by a saddle 14 supported by a bridge 16 which is permanently affixed to the soundboard 18*a* of the body 2, to a second fixed axis 20, formed by a nut 22 which is permanently affixed to the top surface 5*a* of the neck 4, located adjacent to the headstock 6. Further, installed inside the beam 3 of the neck 4 is an adjustment rod (not shown) for preventing the neck 4 from bending or being distorted by the tension force of the guitar strings 10.

A fingerboard (also known as a fretboard 24 on fretted instruments) is an important component of most stringed instruments. The fretboard 24 is a thin, long strip of hard material, usually a re-enforced polymer or wood such as rosewood or ebony, that mates with and is formed on the top surface 5*a* of the neck 4 so as to be located between and space a remainder of the neck 4 from the strings 10. The material from which the fretboard 24 is manufactured should be strong, durable, and stable enough to support and retain the metal frets 9, which are installed on top of the fretboard 24 at regular intervals, and withstand playing wear for years of use. The strings 10 run over the fretboard 24 between the nut 22 and the bridge 16. For conventional stringed musical instruments 1, a heel 26 is formed integrally with a remainder of the neck 2 and extends from the bottom surface 5*b* of the neck 4.

When using the stringed musical instrument 1, the musician moves his or her fingers up and down the neck 4, pressing the strings 10 so as to shorten them and create various pitches as the strings 10 are strummed, plucked, or otherwise excited. Typically, the frets 9 on the fretboard 24 extend across the width of the neck 4 so as to provide a place to anchor the ends of the shortened strings 10 at definite or desired locations.

In the case of an acoustic instrument, such as an acoustic guitar, the body 2 encloses a resonant sound chamber. Strumming, plucking, or otherwise exciting the strings 10 causes the strings 10 to vibrate. This vibration in turn causes the bridge 16 over which the strings 10 extend to vibrate as well. In fact, the bridge 16 forms the vibrating end point of the strings 10 for every note that is played. Vibration of the bridge 16 causes the soundboard 18*a* of the acoustic instrument to vibrate, which in turn causes air entrapped in the sound chamber to move to generate the sound heard through the sound hole 28 upon play of the instrument.

Normally, the strings 10 are tuned to pitch at the top of the neck 4 or headstock 6 where the tuning pegs 8 increase or decrease the tension on each string 10. The user then renders the desired notes by strumming the strings 10 near the middle of the guitar body 2 while pressing the strings 10 which extend over the neck 4 onto the fretboard 24 attached to the top surface 5*a* of the neck 4. The tone of the note produced depends on the tension of the string 10 and the distance between the fret 9 at which the string 10 is depressed onto the neck 4 and the lower anchor point. The smaller the distance between the depressed string 10 and the bridge 16, the higher pitch the resulting tone will be. Increasing the tension of the strings 10 will also produce a note with a higher pitch.

The process 100 of manufacturing a stringed musical instrument 1 having an integral brace body 40 according to the present disclosure begins with providing a substantially rectangular block of material that will ultimately become the integral brace body 40. The term "substantially," as used in this document, is a descriptive term that denotes approximation and means "considerable in extent" or "largely but not wholly that which is specified" and is intended to avoid a strict boundary to the specified parameter. The initial block and the integral brace body 40 are each one, integral piece. By "integral" is meant a single piece or a single unitary part that is complete by itself without additional pieces, i.e., the part is of one monolithic piece formed as a unit.

The material used to form the block is typically wood because the integral brace body 40 is typically made of wood. Preferably, the integral brace body 40 of the musical instrument 1 is made from a domestic (deciduous trees growing in the United States only) hardwood, such as maple, walnut, rosewood, Sitka spruce, or mahogany. The use of domestic hardwood to improve the sound of stringed musical instruments supports the wood sustainability efforts of instrument manufacturers. According to other embodiments, however, the integral brace body 40 may be made of plastic, graphite, or other appropriate materials.

The second step of the process 100 of manufacturing the integral brace body 40 according to the present disclosure is to securely fix the block of material to a machining table. Any suitable mechanism can be used to fix the block of material to the machining table. Preferred mechanisms are either a vacuum or a dedicated fixture.

A chambered workpiece 30 is then formed from and in the block of material during the third step of the process 100 of manufacturing the integral brace body 40 according to the present disclosure. The chambered workpiece 30 is formed using any conventional manufacturing process. Mechanical cutting, laser cutting, and abrasive removal using an abrasive wheel are three example manufacturing processes, as would be known to an artisan. Routing is a preferred process to form the chambered workpiece 30.

Routing is a high-speed process of cutting, trimming, and shaping materials such as wood and plastic. The set up needed to rout the chambered workpiece 30 in the block of material includes an air or electric driven router, a cutting tool often referred to as a router bit, and a guide template. The router is a power tool with a flat base and a rotating blade extending past the base. The spindle may be driven by an electric motor or by a pneumatic motor. The tool routs (hollows out) an area (such as the chambered workpiece 30) in hard material, such as wood or plastic. Routers are used most often in woodworking to create such items as cabinets and musical instruments. They may be handheld or affixed to router tables. Some woodworkers consider the router to be one of the most versatile power tools.

A computer numerically controlled (CNC) router is a computer controlled machine to which the router or spindle mounts. The CNC router can be either a moving gantry style, where the table is fixed and the router spindle moves over it, or fixed bridge design, where the table moves underneath the router spindle, or hand-held style, where the operator moves the machine to the area to be cut and the machine controls the fine adjustments. CAD/CAM software programming is used to model the part that is to be created in the computer and then create a tool path for the machine to follow to cut out the part. The CNC router moves along three axes (X-Y-Z). Most CNC routers have a three motor drive system utilizing either servo or stepper motors. More advanced routers use a four motor system for added speed and accuracy.

The router cutting tool used in the third step of the process 100 is preferably a spiral downcut endmill. A wide range of end mills are available. They come in many different shapes and geometries and are also made of different materials. Endmills typically have three types of end styles: (1) a square end used to drill holes to start slots; (2) a ball nose used to make curved shapes; and (3) a corner radius used to make molds. The spiral downcut endmill used in the subject application has a helical cutting bit. Depending on the helical direction of the cutting bit—this means which way the spiral is wound—the endmill will either move the chips of debris upward or downward. When choosing the directionality of the endmill, the user has two options: an upcut or a downcut endmill. An upcut endmill will eject the chips of waste material to the upper surface of the workpiece. A downcut endmill is the opposite of an upcut endmill and will eject the chips to the bottom of the workpiece. The advantages of using a downcut endmill include a smooth upper surface on the workpiece and a downward force that helps to keep the workpiece secured firmly to the machining table.

Figure 3:
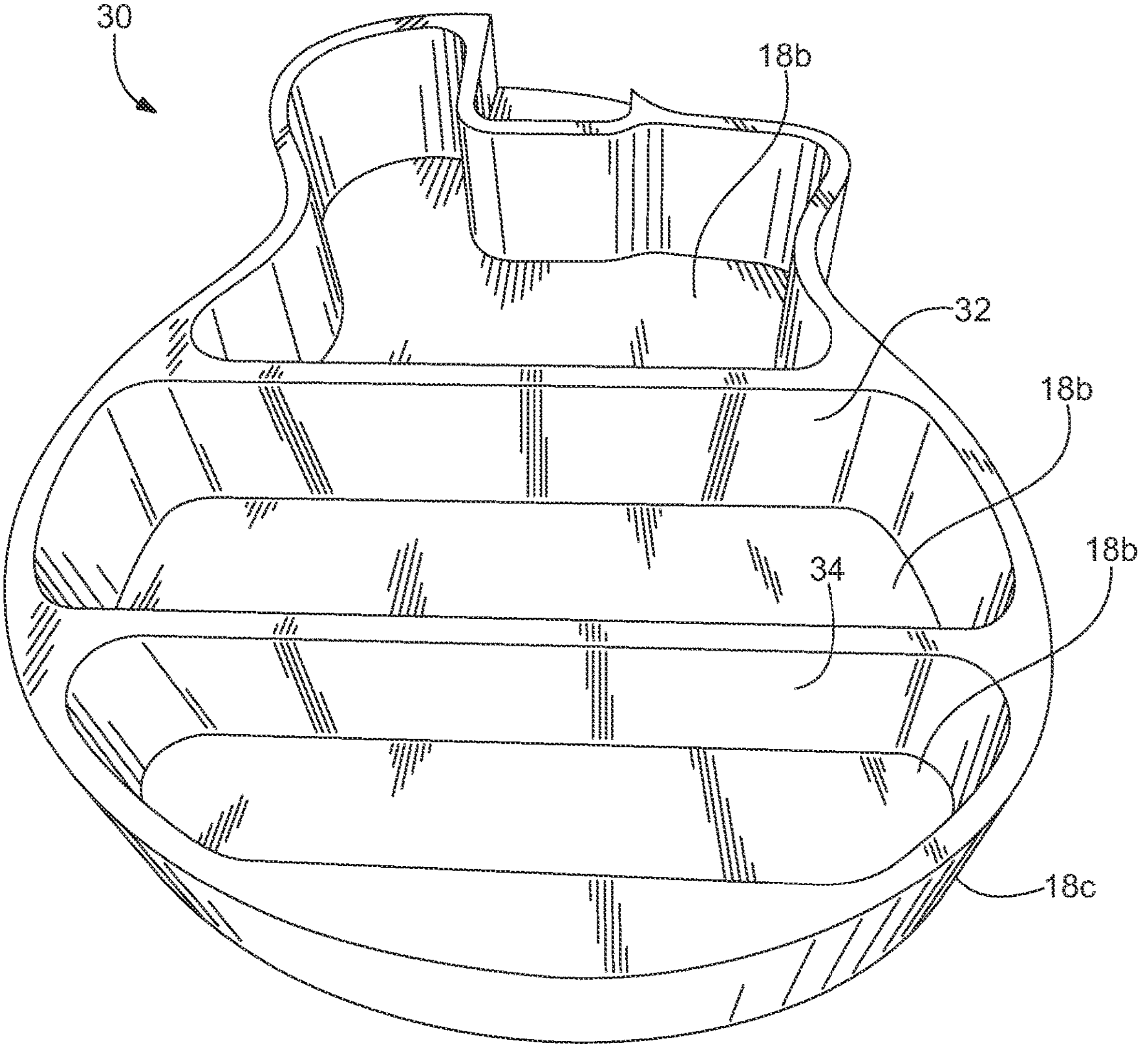
FIG. 3 is a top perspective view of a chambered workpiece, highlighting the ribs that are integral with the back and sidewall of the chambered workpiece, formed as an intermediate component during the process of manufacturing an integral brace body according to the present disclosure.

FIG. 3 is a top perspective view of the chambered workpiece 30 after completion of the third step of the process 100 of manufacturing the integral brace body 40 according to the present disclosure. The chambered workpiece 30 has a solid top or first rib 32 and a solid bottom or second rib 34. By "solid" is meant that the first rib 32 and the second rib 34 are neither hollow nor do they contain spaces, openings, or gaps.

Any suitable number of ribs can be formed in the chambered workpiece 30 depending upon the application. Therefore, although two ribs 32 and 34 are illustrated in FIG. 3, one, three, or more than three ribs could be formed in the chambered workpiece 30. Each of the ribs 32 and 34 is integral with both the back **18*b* and the sidewall 18*c* of the chambered workpiece 30, and each extends horizontally and completely across the width of the chambered workpiece 30 from one edge of the sidewall 18*c* to the opposite edge of the sidewall 18*c*. Thus, the ribs 32 and 34 divide the back 18*b* into three separate chambers: a top chamber above the first rib 32, an intermediate chamber between the first rib 32 and the second rib 34, and a bottom chamber below the second rib 34. The third step of the process 100 involves operating the machining program and using the spiral downcut endmill to remove material inside the block of material as well as cutting the outer profile of the chambered workpiece 30**.

In the fourth step of the process 100 of manufacturing the integral brace body 40 according to the present disclosure, the router cutting tool is preferably a T-slot cutter. T-slot cutters consist of a plain or side milling cutter that is fitted to the end of a narrow shank. They are designed to mill T slots into various materials and are used when a clean surface finish is required. The fourth step of the process 100 involves replacing the spiral downcut endmill used in the first operation of the machining program with a T-slot cutter and implementing a second operation of the machining program. The T-slot cutter drops into the chambered workpiece 30 and removes material from the middle portions of each of the ribs 32 and 34 that remain after the first operation. The result of the second operation with the T-slot cutter can be seen in FIG. 4.

Figure 4:
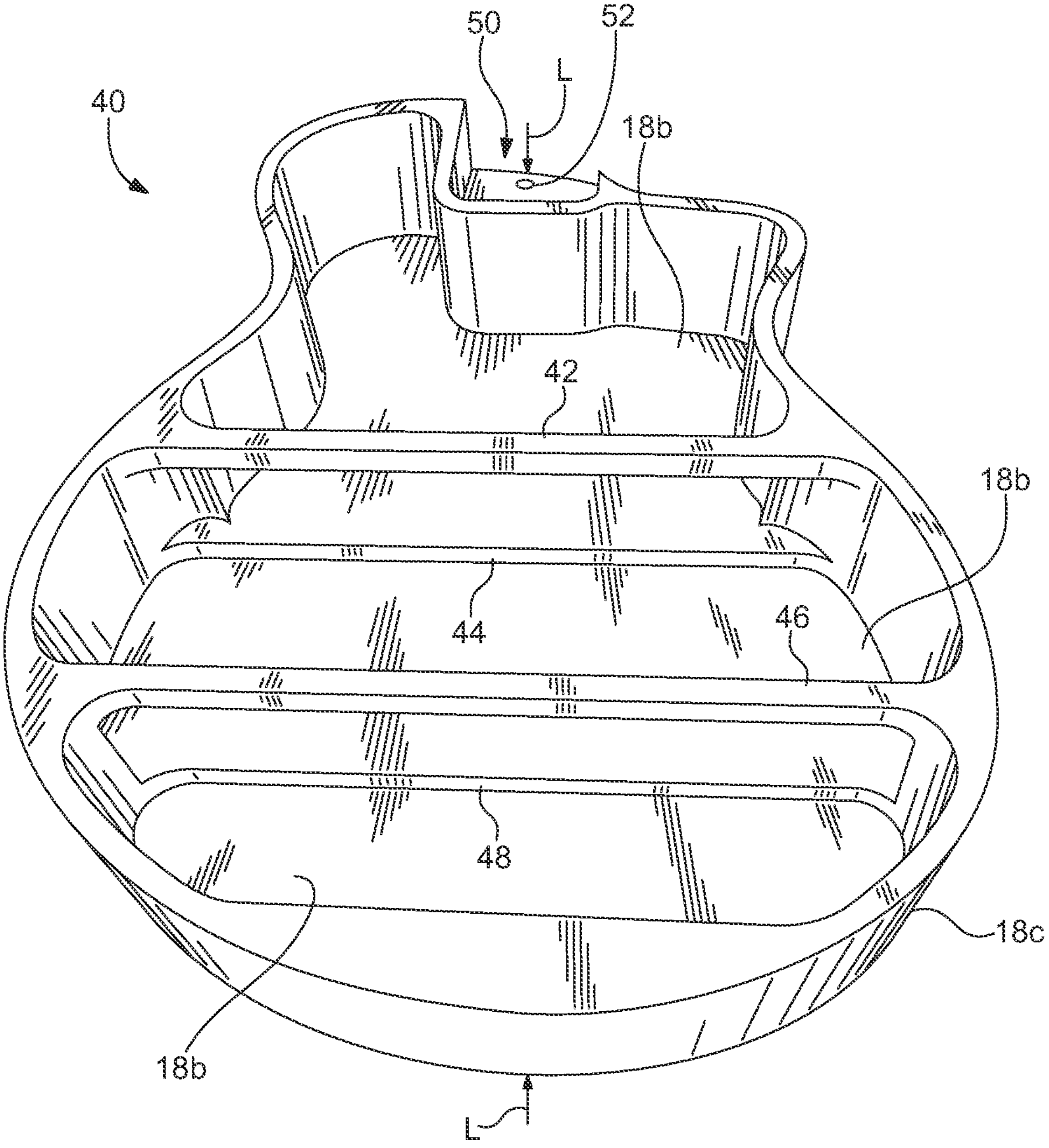
FIG. 4 is a top perspective view of the integral brace body highlighting the braces that are integral with one or both of the back and sidewall of the integral brace body.

FIG. 4 is a top perspective view of the integral brace body 40, which is the result after completion of the fourth step of the process 100 of manufacturing the integral brace body 40 according to the present disclosure. The integral brace body 40 has a longitudinal axis L and four individual braces, with two braces formed from each of the ribs 32 and 34. The first rib 32 results in (1) a first brace 42 that extends horizontally and completely across the width of the integral brace body 40 from one top edge of the sidewall 18*c* to the opposite top edge of the sidewall 18*c*; and (2) a second brace 44 that extends horizontally and completely across the width of the integral brace body 40 from one bottom edge of the sidewall 18*c* to the opposite bottom edge of the sidewall 18*c*. The first brace 42 is integral with and connected directly to the sidewall 18*c*, although not with the back 18*b*, of the integral brace body 40. The second brace 44 is integral with and connected directly to both the sidewall 18*c* and the back 18*b* of the integral brace body 40. The second rib 34 results in (1) a third brace 46 that extends horizontally and completely across the width of the integral brace body 40 from one top edge of the sidewall 18*c* to the opposite top edge of the sidewall 18*c*; and (2) a fourth brace 48 that extends horizontally and completely across the width of the integral brace body 40 from one bottom edge of the sidewall 18*c* to the opposite bottom edge of the sidewall 18*c*. The third brace 46 is integral with and connected directly to the sidewall 18*c*, although not with the back 18*b*, of the integral brace body 40. The fourth brace 48 is integral with and connected directly to both the sidewall 18*c* and the back 18*b* of the integral brace body 40.

Any suitable number of braces can be formed in the integral brace body 40 depending upon the number of ribs formed in the chambered workpiece 30. Therefore, although four braces 42, 44, 46, and 48 are illustrated in FIG. 4, fewer or more braces could be formed in the integral brace body 40. The first brace 42 and the third brace 46 will ultimately support the soundboard 18*a* of the musical instrument 1. The second brace 44 and the fourth brace 48 are integral with and support the back 18*b* of the musical instrument 1.

Further illustrated in FIG. 4 is an aperture 50 into which the neck 4 will be inserted. Still further illustrated in FIG. 4 is a clearance hole 52. Although one clearance hole 52 is visible in FIG. 4, two clearance holes 52 are typical and three or more clearance holes 52 are possible. The clearance hole 52 is located proximate to the neck end of the body 2 and is configured to receive a fastener (such as a bolt) used to affix the neck 4 to the body 2 of the musical instrument 1.

Figure 5:
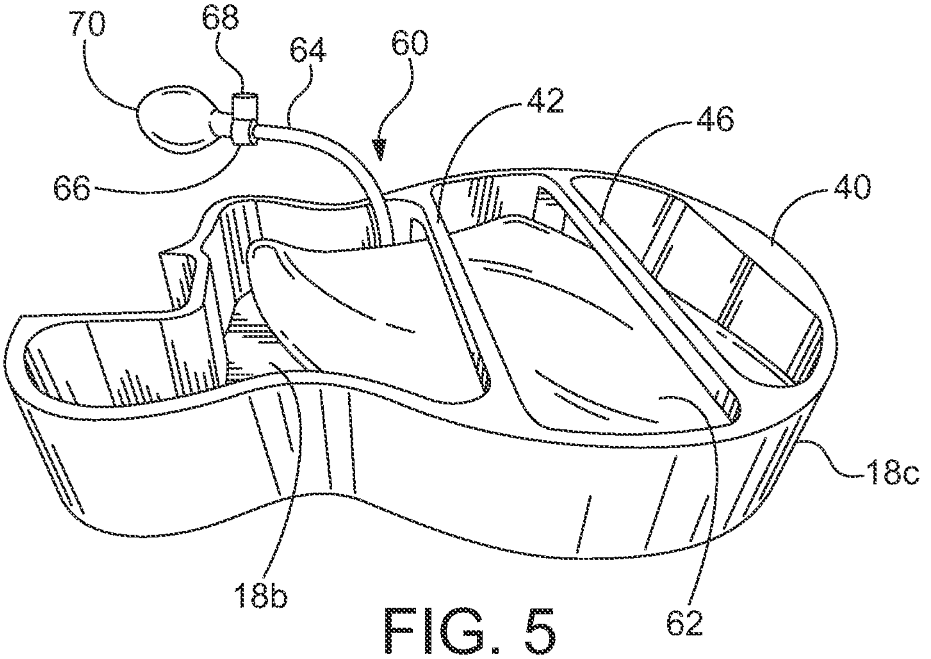
FIG. 5 is a side perspective view of the integral brace body shown in FIG. 4, illustrating the placement of an inflatable wedge inside the integral brace body.

FIG. 5 illustrates the next step in the process 100 of manufacturing the stringed musical instrument 1 after formation of the integral brace body 40. In this step, a wedge 60 is placed inside the integral brace body 40. The wedge 60 has a number of components: (1) a bladder 62 that can be inflated using a gas such as air so that the bladder 62 becomes distended; (2) a pump 70 that can be used to deliver the gas to the bladder 62; (3) a line 64 that connects the pump 70 to the bladder 62 and provides gas to, and allows gas to exit from, the bladder 62 to inflate and deflate the bladder 62, respectively; (4) a valve 66 that, when closed, allows the line 64 to deliver gas to the bladder 62 and, when opened, allows gas to exit the bladder 62 through the line 64; and (5) optionally, a gauge 68 that provides to the user a measure of the pressure in the bladder 62 and the line 64. In a preferred embodiment, the wedge 60 is an inflatable air wedge. As shown in FIG. 5, the wedge 60 is placed on top of both the second brace 44 and the fourth brace 48 and under both the first brace 42 and the third brace 46.

In the next step of the process 100, an adhesive such as glue is applied to the top surfaces of the sidewall 18*c*, the first brace 42, and the third brace 46 of the integral brace body 40. Thereafter, the soundboard 18*a* is placed on top of the integral brace body 40 and into contact with the adhesive making sure to allow overhang of the soundboard 18*a* along all sides of the integral brace body 40. The soundboard 18*a* must also be placed on top of the integral brace body 40 so that the pump 70 and at least part of the line 64 extend through the sound hole 28. Thus, the pump 70 is accessible to a user outside the soundboard 18*a* and the integral brace body 40. The valve 66 and, if provided, the gauge 68 must also be accessible and visible to the user, respectively, although those components may reside in the sound hole 28 or just inside the soundboard 18*a* and the integral brace body 40 below the sound hole 28.

Figure 6:
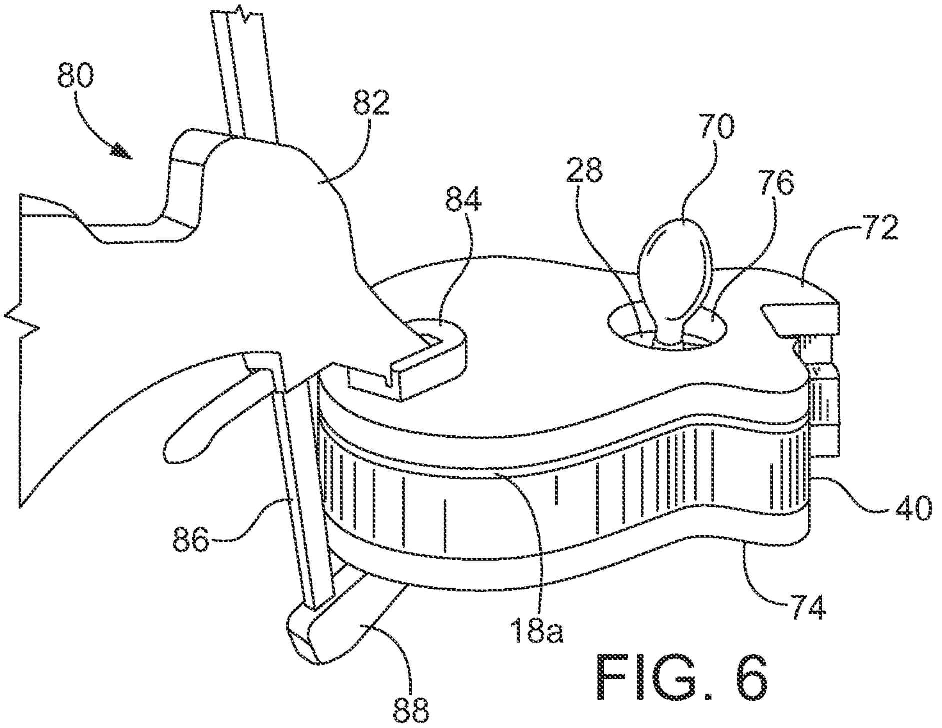
FIG. 6 is a side perspective view of the integral brace body shown in FIG. 5, illustrating a glue-up configuration.

In the next step of the process 100, as illustrated in FIG. 6, two clamping cauls are provided. A top or first clamping caul 72 placed on and against the top surface of the soundboard 18*a* and a bottom or second clamping caul 74 placed on and against the bottom surface of the back 18*b*. Clamping cauls are used, in general and in this application, when clamping a stack of components for glue up to form a joint structure. The clamping cauls 72 and 74 provide pressure in places beyond the reach of standard clamps, reduce the number of clamps required, keep the components of the stack aligned, help to pull the joint tight and keep the joint at the desired angle, and protect the workpiece from direct contact with the clamp.

Care must be taken when placing the first clamping caul 72 on and against the top surface of the soundboard 18*a* to assure that the pump 70 remains accessible to a user outside the soundboard 18*a*, the integral brace body 40, and the first clamping caul 72. To assure such accessibility, the first clamping caul 72 has an orifice 76 configured to align with the sound hole 28 of the soundboard 18*a* when the first clamping caul 72 is placed on and against the top surface of the soundboard 18*a*.

In the next step of the process 100, a conventional vise or squeeze clamp 80 is provided and used to clamp securely the outside rim of a glue caul or stack. The glue caul includes, from top to bottom, the first clamping caul 72, the soundboard 18*a*, the adhesive, the integral brace body 40, and the second clamping caul 74. Generally, the clamp 80 is a metal tool typically attached to a workbench with movable jaws that are used to hold an object firmly in place while work is done on the object. Specifically, the clamp 80 has a body 82 from which extends an integral head 84. The body 82 can travel up and down an arm 86 from which extends an integral foot 88.

As shown in FIG. 6, the head 84 of the clamp 80 is placed in contact with the top surface of the first clamping caul 72 and the foot 88 of the clamp 80 is supported on the workbench and placed in contact with the bottom surface of the second clamping caul 74. The clamp 80 is then activated (i.e., the head 84 travels down the arm 86) so that the distance between the head 84 and the foot 88 is reduced. This action causes pressure to be applied by the head 84 to the top surface of the first clamping caul 72 and by the foot 88 to the bottom surface of the second clamping caul 74. The amount of pressure that is applied will depend on the strength of the materials in the glue caul, and can be predetermined by the user. By "predetermined" is meant determined beforehand, so that the predetermined characteristic must be determined, i.e., chosen or at least known, before the musical instrument 1 is manufactured.

In the next step of the process 100, the user closes the valve 66 and activates the pump 70 so that gas inflates the bladder 62 of the wedge 60. Inflation continues until even pressure is applied to the two rows of braces: the row defined by the first brace 42 and the second brace 44, and the row defined by the third brace 46 and the fourth brace 48. The amount of pressure that is applied by the bladder 62 will depend on the shape of the soundboard 18*a* that is desired for the musical instrument 1.

The soundboard 18*a* may be flat or domed. If domed, the extent of the arch or curvature given to the soundboard 18*a* can be predetermined by the user. An advantage of a domed soundboard 18*a* over a flat soundboard 18*a* is an increased strength and resistance to deformations. A disadvantage is that the decreased flexibility may decrease (in a frequency-dependent manner) the volume of specific pitches. This disadvantage holds especially true for low frequencies like the fundamental mode. For high frequencies, the volume will hardly be influenced by the curvature of the soundboard 18*a*. Experience has resulted in designs for classical guitars with an offset (maximum deviation from the flat soundboard 18*a*) of about 2 to 3 mm for the soundboard 18*a*. This should bring the soundboard 18*a* into a dome shape.

A flat soundboard 18*a* will result when the amount of pressure that is applied by the bladder 62 to the two rows of braces is below a threshold. The application of pressure beyond that threshold will lift the first brace 42 and the third brace 46 into contact with the soundboard 18*a* and begin to dome the soundboard 18*a*. (The first clamping caul 72 may have the same curvature desired in the domed soundboard 18*a* so that the first clamping caul 72 and the domed soundboard 18*a* are nested.) Thereafter, the application of an increased amount of pressure will increase the dome created in the soundboard 18*a*. Once the desired amount of pressure is reached, needed to create the predetermined dome shape, the user stops inflating the bladder 62. The user may observe the gauge 68, if present, to determine the amount of pressure that exists in the bladder 62 and the line 64.

In the next step of the process 100, the glue caul is allowed to sit for a predetermined amount of time. The time must be sufficient to allow (1) the adhesive to connect substantially permanently the soundboard 18*a* to the integral brace body 40 (e.g., for the glue to dry); and (2) the soundboard 18*a* to retain its predetermined dome (if any). Finally, after passage of the predetermined amount of time, the clamp 80 is deactivated (i.e., the head 84 travels up the arm 86) so that the distance between the head 84 and the foot 88 is increased until no pressure is applied by the clamp 80 to the glue stack. The clamp 80 is then removed. Removal of the clamp 80 allows the user, in turn, to remove the first clamping caul 72 and the second clamping caul 74 from the caul stack.

The user then opens the valve 66 and deflates the bladder 62 of the wedge 60 until the wedge 62 can be removed from the integral brace body 40 though the sound hole 28 of the soundboard 18*a*. The result is the integral brace body 40 with the soundboard 18*a* in place and adhered to the top of the integral brace body 40 to form the body 2 of the musical instrument 1. Conventional steps can then be applied, using the body 2 having the integral brace body 40, to manufacture the stringed musical instrument 1.

Figure 7:
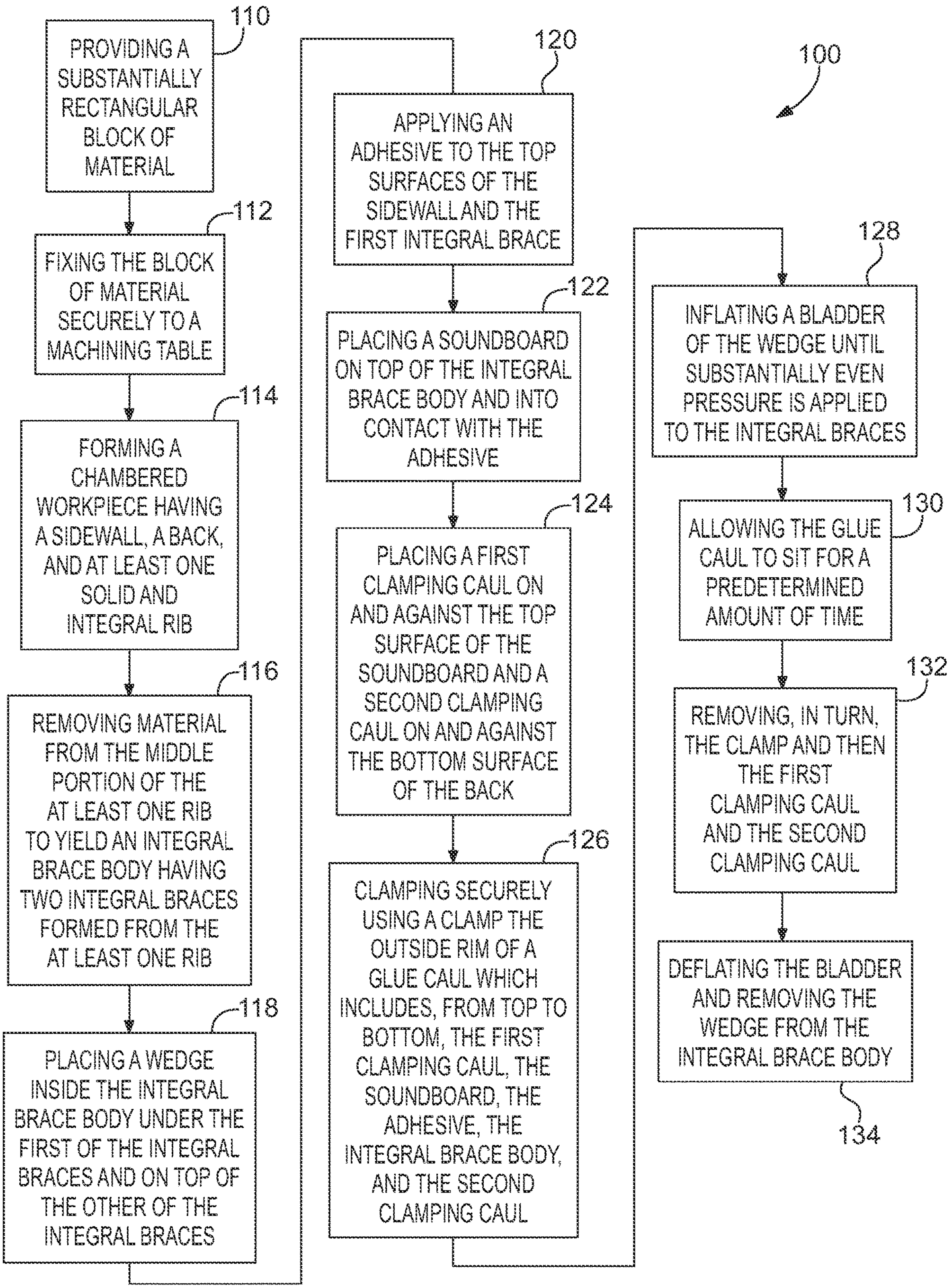
FIG. 7 is a flow chart illustrating the steps of an example process of manufacturing the body of a musical instrument having the integral brace body shown in FIG. 4.

FIG. 7 is a flow chart illustrating the steps of the example process 100 of manufacturing the musical instrument 1 having the integral brace body 40 shown in FIG. 4. Those steps include the following:

Step 110: providing a substantially rectangular block of material that will ultimately become the integral brace body 40;

Step 112: fixing the block of material securely to a machining table;

Step 114: forming the chambered workpiece 30, having at least one solid rib that is integral with and connected directly to both the back 18*b* and the sidewall 18*c* of the chambered workpiece 30 and extends horizontally and completely across the width of the chambered workpiece 30 from one edge of the sidewall 18*c* to the opposite edge of the sidewall 18*c*, from and in the block of material preferably using a spiral downcut endmill;

Step 116: removing material from the middle portion of the at least one rib, preferably using a T-slot cutter, to yield the integral brace body 40 having two integral braces formed from the at least one rib;

Step 118: placing the wedge 60 inside the integral brace body 40 under the first of the integral braces 42 and on top of the other of the integral braces 44;

Step 120: applying an adhesive to the top surfaces of the sidewall 18*c* and the first integral brace 42;

Step 122: placing the soundboard 18*a* on top of the integral brace body 40 and into contact with the adhesive;

Step 124: placing the first clamping caul 72 on and against the top surface of the soundboard 18*a* and the second clamping caul 74 on and against the bottom surface of the back 18*b;*

Step 126: clamping securely using the clamp 80 the outside rim of the glue caul which includes, from top to bottom, the first clamping caul 72, the soundboard 18*a*, the adhesive, the integral brace body 40, and the second clamping caul 74;

Step 128: inflating the bladder 62 of the wedge 60 until substantially even pressure is applied to the integral braces 42 and 44;

Step 130: allowing the glue caul to sit for a predetermined amount of time sufficient to allow the adhesive to connect substantially permanently the soundboard 18*a* to the integral brace body 40 and the soundboard 18*a* to retain its predetermined dome (if any);

Step 132: removing, in turn, the clamp 80 and then the first clamping caul 72 and the second clamping caul 74; and Step 134: deflating the bladder 62 and removing the wedge 62 from the integral brace body 40.

Details about each of the steps have been provided above in the context of describing the process 100 and the related integral brace body 40. The process 100 offers significant savings in time for the manufacture of the body 2 of the musical instrument 1 having the integral brace body 40 relative to a conventional body 2. Specifically, the process 100 can manufacture the body 2 of the musical instrument 1 having the integral brace body 40 in about 15 minutes when the time to manufacture a conventional body 2 is about 25-30 minutes.

An important advantage of using the integral brace body 40 is that the integral brace body 40 enables unconventional grain orientations for the braces 42, 44, 46, and 48. The wood grains of most bodies 2 of musical instruments 1 run in a longitudinal direction and, therefore, are parallel with the neck 4 and the strings 10. There are at least three reasons for having the body grain align with the longitudinal axis of the instrument 1: (1) wood shrinkage and expansion with the grain is a small fraction of the amount the wood shrinks or expands cross grain and it is desirable to have the maximum stability in relation to the scale length; (2) sound or vibration travels faster with the grain than across the grain; and (3) wood grain is stronger in the direction along the grain lines (although strength is a secondary characteristic to resonance for an instrument, strength is still important).

The integral brace body 40 allows the user to predetermine the orientation of the grain of the braces 42, 44, 46, and 48 and of the back 18*b* of the integral brace body 40. FIGS.

Figure 8A:
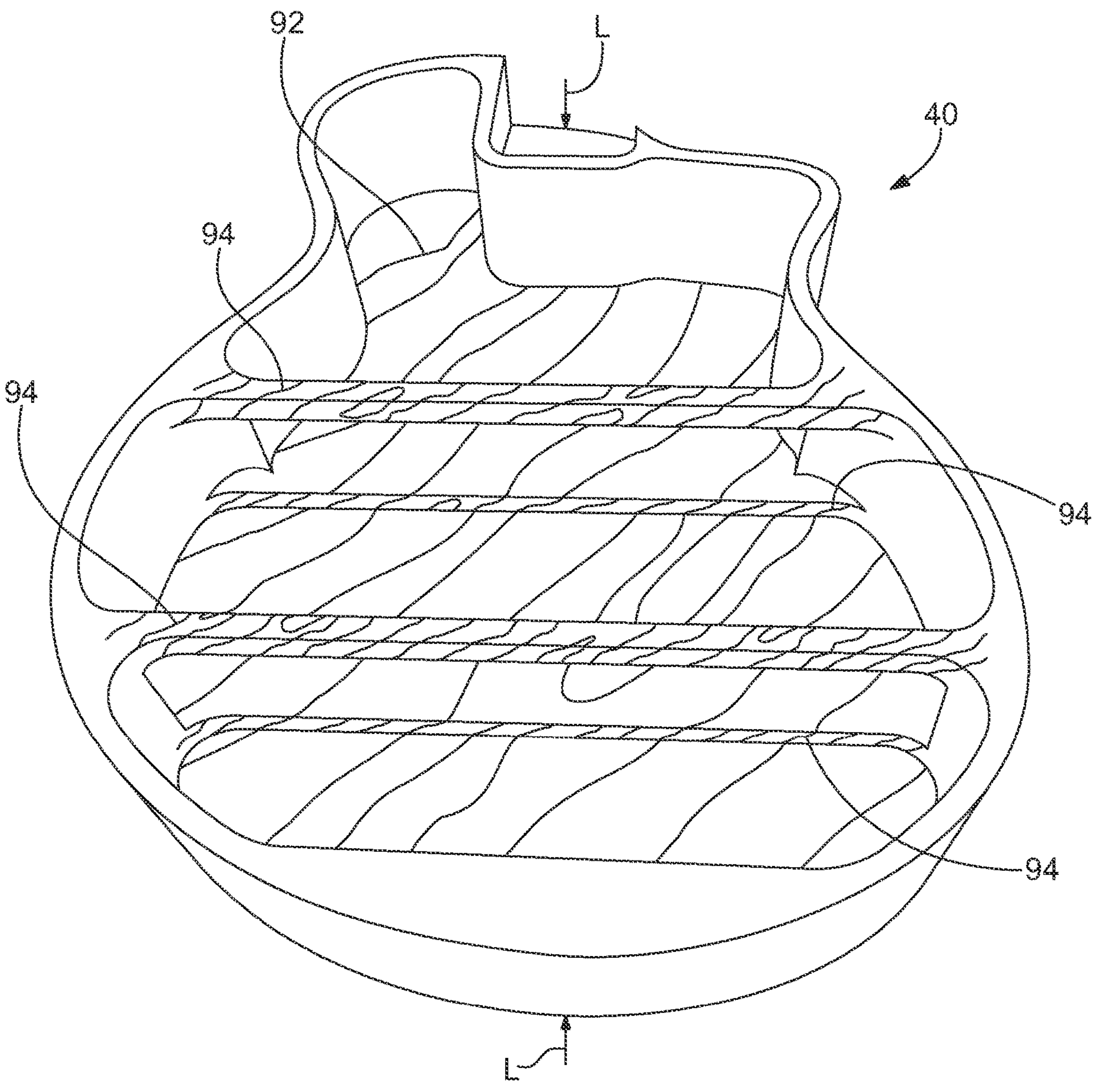
FIG. 8A is a schematic drawing illustrating brace grains and back grains at a 45-degree angle to the longitudinal axis of the integral brace body.
Figure 8B:
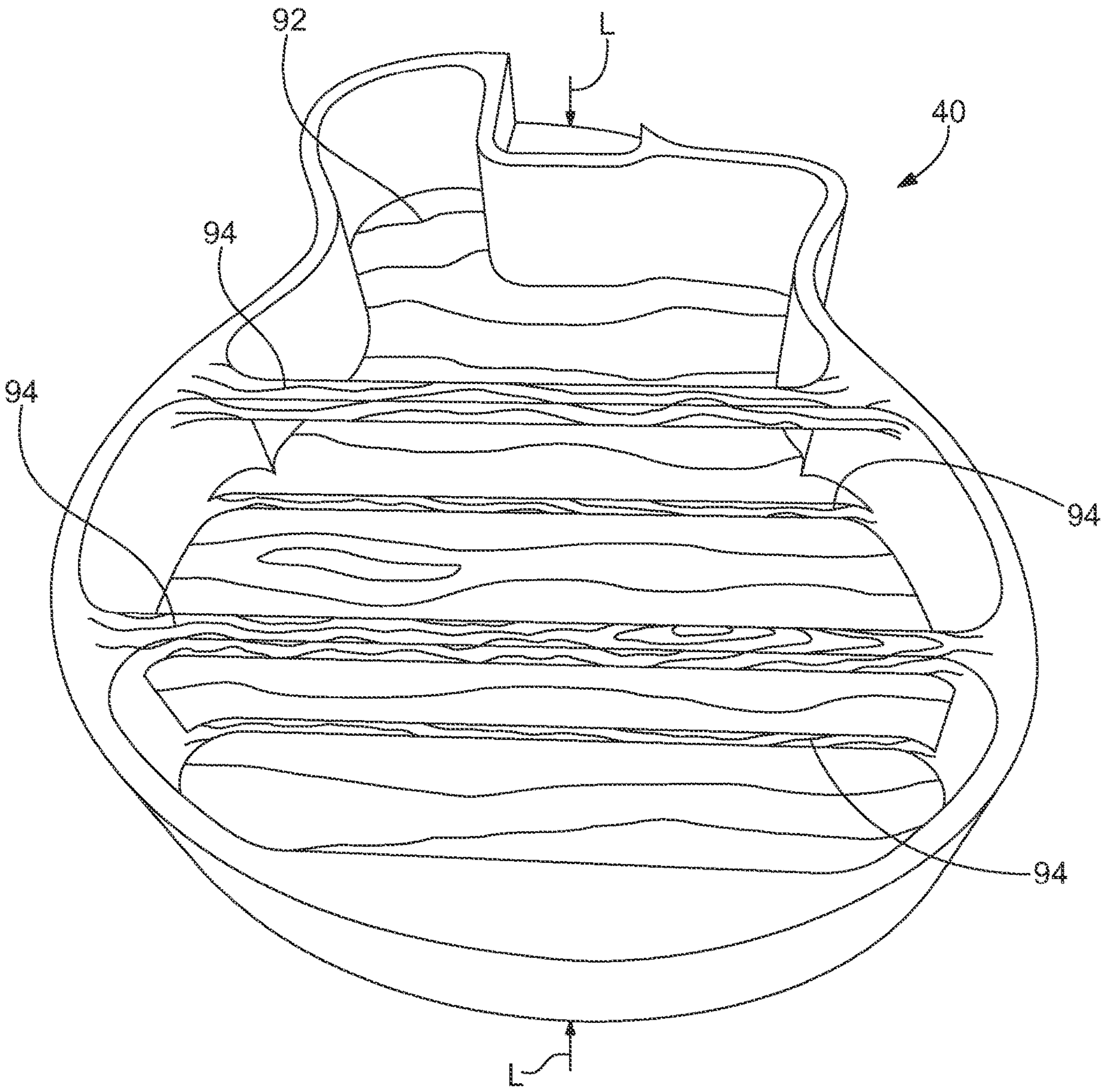
FIG. 8B is a schematic drawing illustrating horizontal brace grains and back grains that are perpendicular (i.e., at a 90-degree angle) to the longitudinal axis of the integral brace body.
Figure 8C:
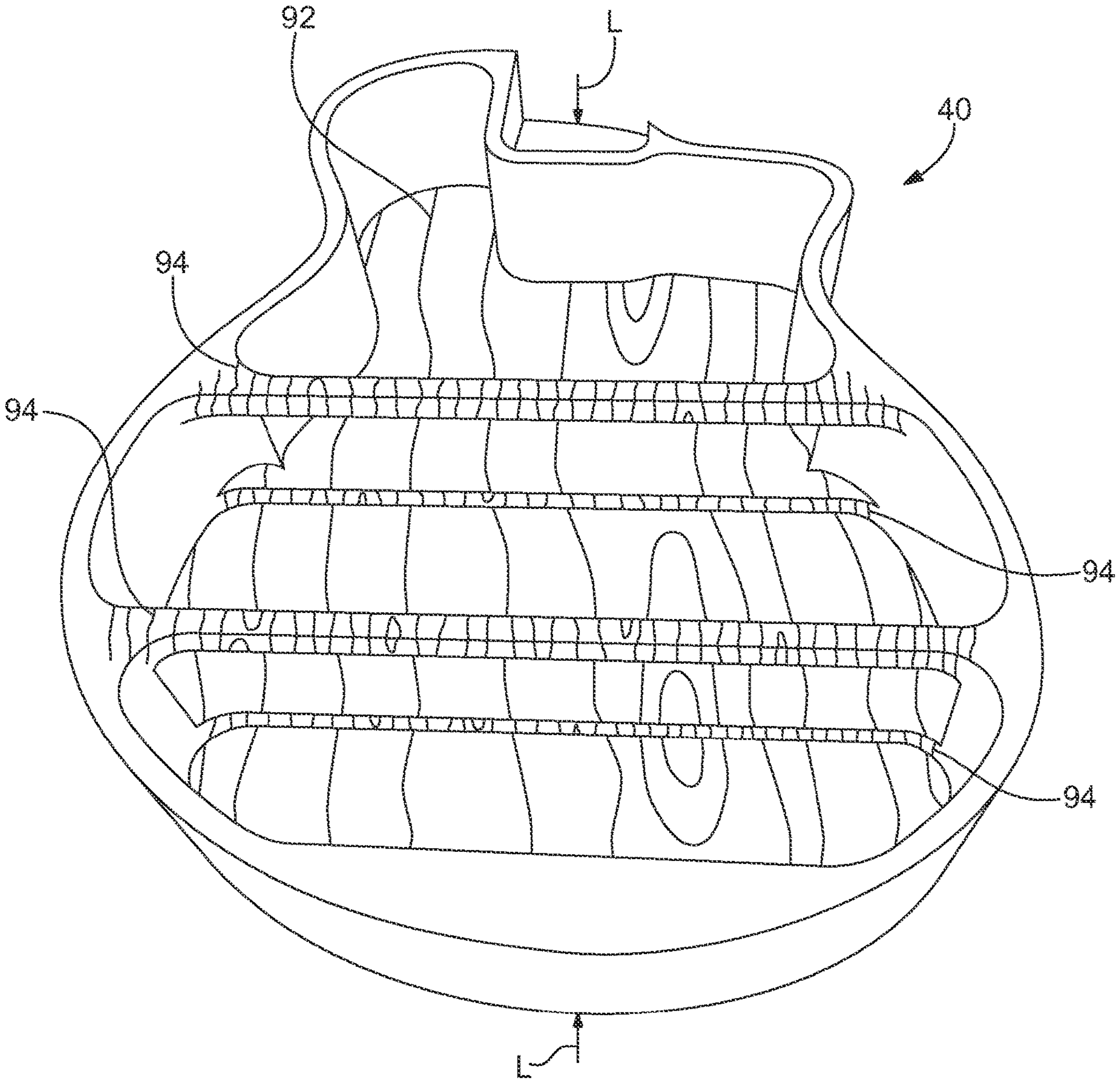
FIG. 8C is a schematic drawing illustrating brace grains and back grains that are parallel to (i.e., vertically aligned with) the longitudinal axis of the integral brace body.

8A, 8B, and 8C illustrate three orientations—although any other orientation is possible. FIG. 8A is a schematic drawing illustrating the grains 94 of the braces 42, 44, 46, and 48 and the grains 92 of the back 18*b* at a 45-degree angle to the longitudinal axis L of the integral brace body 40. This 45-degree orientation achieves a balance or trade-off between the strength and the flexibility of the braces 42, 44, 46, and 48. FIG. 8B is a schematic drawing illustrating the grains 94 of the braces 42, 44, 46, and 48 and the grains 92 of the back 18*b* perpendicular (i.e., at a 90-degree angle) to the longitudinal axis L of the integral brace body 40. This perpendicular orientation maximizes the strength of the braces 42, 44, 46, and 48. FIG. 8C is a schematic drawing illustrating the grains 94 of the braces 42, 44, 46, and 48 and the grains 92 of the back 18*b* parallel to (i.e., vertically aligned with) the longitudinal axis L of the integral brace body 40. This longitudinal orientation maximizes the flexibility of the braces 42, 44, 46, and 48.

Tests were conducted on a standard (or control) ukulele and on a prototype ukulele using the integral brace body 40 to determine and compare tonal and structural characteristics. The standard (or control) ukulele was the TIK model sold by C. F. Martin & Co., Inc. The TIK model is made from the Hawaiian wood koa (hence the K). The T in the model name indicates that the instrument is a tenor ukulele. Tenors are quite a bit larger than soprano ukuleles (the common variety) and a touch bigger than concert models. The increased length, deeper body, and wider bout promises more volume, more mid-range, increased bass, and a longer neck to comfortably play fingerstyle. Martin labels its ukuleles from 0 to 5, with 0 being the entry-level model and 5 boasting the finest woods and accoutrements. The TIK is a 1, with a relatively modest price.

Tests were done to compare the tonal differences of the standard control model (TIK ukulele) with an SC ukulele prototype incorporating the integral brace body 40. The SC ukulele prototype exhibited favorable tonal qualities when compared to the TIK ukulele currently in production. Each instrument was strummed consistently, recorded, and analyzed in a spectrograph displaying frequency, amplitude, sustain, and harmonic content. Identical musical recordings were made with each instrument in order to be played back consecutively and compared to each other in a subjective audio demonstration.

As illustrated in the Table below, the SC ukulele demonstrated favorable tonal characteristics including higher overall amplitude and more pronounced mid-range with dynamic complexity.

TABLE

| | AMPLITUDE (dB) | |
|---|---|---|
| | T1K Ukulele | SC Ukulele |
| Total | 71.75 | 74.77 |
| Fundamental | 53.42 | 52.50 |
| Mid-Range | 54.96 | 60.05 |
| Overtones | 74.02 | 76.92 |

The Table illustrates sound test results (amplitude) based on tests done on the control and prototype ukuleles. Sound is measured in decibels, dB, which is the most common unit to measure loudness. The unit measures the amplitude of a sound wave, i.e., the highest extent of a vibration from a position of equilibrium. In simple words, it is the pressure or forcefulness of the sound or the "intensity" of sound that is represented in dB. The human ear is sensitive to sounds ranging from 0 dB (eerie silence) to about 130 dB (painfully loud).

By processing the body and braces of the stringed musical instrument 1 from one unitary piece of material, the necessity for separate processing and adhesion of braces before assembly is avoided. Also avoided is the need for a joint between the braces and the back of the body. Novel construction methods are also possible, necessitating less tooling and labor time. Unconventional grain orientations are also enabled through the use of this technique. The integral brace body 40 can be applicable to all stringed musical instruments, given the appropriate care in construction, whether milled from natural materials or formed from appropriate synthetic materials. In several applications, incorporation of the integral brace body 40 and of the process 100 results in more robust sonic and improved tonal output of stringed instruments. Specifically, this improved tonal quality was demonstrated via internally conducted testing on ukulele-family instruments, but its potential is not limited to those particular stringed musical instruments.

Among the advantages of the disclosed integral brace body 40 are: (1) removes the necessity of a separate process to apply braces to the soundboard; (2) enables unconventional grain orientations for the braces; (3) saves manufacturing labor hours; (4) allows for single piece flow without having to use different materials for different parts; (5) an inflatable, removable bladder allows for tensioning from the inside of a musical instrument during glue up with the bladder removed after the musical instrument body assembly process; (6) the integrated top bracing is machined from a single block of material; (7) there are no separate braces; and (8) all guitar body shapes and sizes of stringed musical instruments can utilize this technology. The disclosure includes a novel integration of soundboard support braces directly manufactured from the same workpiece as the back and sidewall of the stringed musical instrument. This disclosure, novel in itself, allows the use of novel production and assembly techniques in the construction of stringed musical instruments.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

The invention claimed is:

1. An integral brace body having a longitudinal axis and providing support for a soundboard of a musical instrument, the integral brace body comprising:

a back configured to face the soundboard, the back defining a width of the integral brace body;

a sidewall integral with, connected directly to, and extending away from the back to form a top edge that engages the soundboard, thereby spacing the back from the soundboard, with the back, the sidewall, and the soundboard creating an internal space for sound resonance;

a first brace that extends horizontally and completely across the width of the integral brace body from a first portion of the top edge of the sidewall to a second portion of the top edge of the sidewall, the first brace being integral with and connected directly to the sidewall, although not with the back, of the integral brace body; and a second brace that extends horizontally and completely across the width of the integral brace body from a third portion of the sidewall to a fourth portion of the sidewall, the second brace being integral with and connected directly to both the sidewall and the back of the integral brace body.

2. The integral brace body according to claim 1 wherein the integral brace body is devoid of any separate or non-integral braces.

3. The integral brace body according to claim 1 wherein the back, the first brace, and the second brace each have a grain that is substantially perpendicular to the longitudinal axis.

4. The integral brace body according to claim 1 wherein the back, the first brace, and the second brace each have a grain that is substantially aligned with the longitudinal axis.

5. The musical instrument comprising the integral brace body according to claim 1.

6. The musical instrument according to claim 5, wherein the musical instrument is a ukulele.

7. The musical instrument according to claim 5, wherein the musical instrument is a guitar.

8. The integral brace body according to claim 1 wherein the integral brace body is made of a domestic hardwood.

9. An integral brace body having a longitudinal axis and providing support for soundboard of a musical instrument, the integral brace body comprising:

a back configured to face the soundboard, the back defining a width of the integral brace body;

a sidewall integral with, connected directly to, and extending away from the back to form a top edge that engages the soundboard, thereby spacing the back from the soundboard, with the back the sidewall, and the soundboard creating internal space for sound resonance;

a first brace that extends horizontally and completely across the width of the integral brace body from a first portion of the top edge of the sidewall to a second portion of the top edge of the sidewall, the first brace being integral with and connection directly to the sidewall, although not with the back, of the integral brace body; and a second brace that extends horizontally and completely across the width of the integral brace body a third portion of the sidewall to a fourth portion of the sidewall, the second brace being integral with and connected directly to both the sidewall and the back of the integral brace body, wherein the back, the first brace, and the second brace each have a grain that is either oriented at an angle of about 45 degrees to the longitudinal axis or substantially aligned with the longitudinal axis.

10. A process for manufacturing a stringed musical instrument having a longitudinal axis and an integral soundboard support, the process comprising:

providing a substantially rectangular block of material;

fixing the block of material securely to a machining table;

forming a chambered workpiece having a sidewall, a back, and at least one solid and integral rib;

removing material from the middle portion of the at least one rib to yield an integral brace body having two integral braces formed from the at least one rib;

placing a wedge inside the integral brace body under the first of the integral braces and on top of the other of the integral braces;

applying an adhesive to the top surfaces of the sidewall and the first integral brace;

placing a soundboard on top of the integral brace body and into contact with the adhesive;

placing a first clamping caul on and against a top surface of the soundboard and a second clamping caul on and against a bottom surface of the back;

clamping securely using a clamp the outside rim of a glue caul which includes, from top to bottom, the first clamping caul, the soundboard, the adhesive, the integral brace body, and the second clamping caul;

inflating a bladder of the wedge until substantially even pressure is applied to the integral braces;

allowing the glue caul to sit for a predetermined amount of time;

removing, in turn, the clamp and then the first clamping caul and the second clamping caul; and deflating the bladder and removing the wedge from the integral brace body.

11. The process according to claim 10 wherein the step of forming the chambered workpiece includes routing with a spiral downcut endmill.

12. The process according to claim 10 wherein the step of removing material from the middle portion of the at least one rib includes routing with a T-slot cutter.

13. The process according to claim 10 wherein the step of placing the soundboard on top of the integral brace body includes assuring that a pump and at least part of a line of the wedge extend through a sound hole of the soundboard.

14. The process according to claim 10 wherein the step of placing the first clamping caul on and against a top surface of the soundboard includes aligning an orifice of the first clamping caul with a sound hole of the soundboard.

15. The process according to claim 10 wherein the step of inflating the bladder of the wedge continues until the pressure applied to the first of the integral braces lifts the first of the integral braces into contact with the soundboard and begins to dome the soundboard.

16. The process according to claim 10 wherein the predetermined amount of time for which the glue caul is allowed to sit is sufficient to allow the adhesive to connect substantially permanently the soundboard to the integral brace body.

17. The process according to claim 10 wherein the wedge is removed from the integral brace body though a sound hole of the soundboard.

18. The process according to claim 10 wherein the back and the two integral braces each have a grain that is oriented at an angle of about 45 degrees to the longitudinal axis.

19. The process according to claim 10 wherein the back and the two integral braces each have a grain that is substantially perpendicular to the longitudinal axis.

20. The process according to claim 10 wherein the back and the two integral braces each have a grain that is substantially aligned with the longitudinal axis.

* * * * *